US011998105B2

(12) United States Patent
Hertel

(10) Patent No.: US 11,998,105 B2
(45) Date of Patent: Jun. 4, 2024

(54) HANDHELD CONTROLLER WITH SAFETY HARNESS ASSEMBLY

(71) Applicant: Kevin Hertel, San Francisco, CA (US)

(72) Inventor: Kevin Hertel, San Francisco, CA (US)

( * ) Notice: Subject to any disclaimer, the term of this patent is extended or adjusted under 35 U.S.C. 154(b) by 0 days.

(21) Appl. No.: 17/546,887

(22) Filed: Dec. 9, 2021

(65) Prior Publication Data

US 2022/0175123 A1 Jun. 9, 2022

Related U.S. Application Data

(60) Provisional application No. 63/123,066, filed on Dec. 9, 2020.

(51) Int. Cl.

| | |
|---|---|
| ***G08B 21/00*** | (2006.01) |
| ***A45F 5/00*** | (2006.01) |
| ***F21L 4/02*** | (2006.01) |
| ***F21V 23/04*** | (2006.01) |
| ***G08C 17/00*** | (2006.01) |
| ***H04R 1/02*** | (2006.01) |
| *A63C 17/00* | (2006.01) |

(52) U.S. Cl.

CPC *A45F 5/00* (2013.01); *F21L 4/02* (2013.01); *F21V 23/0414* (2013.01); *F21V 23/045* (2013.01); *G08C 17/00* (2013.01); *H04R 1/028* (2013.01); *A45F 2005/002* (2013.01); *A45F 2005/006* (2013.01); *A45F 2005/008* (2013.01); *A63C 17/0013* (2013.01)

(58) Field of Classification Search

CPC .................. A45F 5/00; A45F 2005/002; A45F 2005/006; A45F 2005/008; A45F 2200/0516; F21L 4/02; F21V 23/0414; F21V 23/045; F21V 21/0816; G08C 17/00; H04R 1/028; A63C 17/0013; A63C 2203/12; A63C 2203/18; A63C 2203/22

USPC ........................................................ 340/12.55

See application file for complete search history.

(56) References Cited

U.S. PATENT DOCUMENTS 1,556,860 A * 10/1925 Lovaas ............... F21V 23/0414 340/321
5,921,657 A * 7/1999 Case ......................... A45F 5/02 362/103
6,916,104 B2 * 7/2005 Parsons ................... F21V 21/08 362/396
8,303,129 B1 * 11/2012 Thielen ............... F21V 21/0816 362/108

(Continued)

*Primary Examiner* — Mark S Rushing
(74) *Attorney, Agent, or Firm* — The Rapacke Law Group, P.A.; Andrew Rapacke

(57) ABSTRACT

An asymmetrically shaped handheld controller and harness assembly for securing safety accessories to the handheld controller for electric personal mobility devices (EPMDs), and a kit thereof, generally includes an asymmetrically shaped handheld controller, an adjustable and a flexible strap that is perforated along its length, releasable connectors that secure the flexible strap about the controller, and headlight and taillight assemblies. The flexible strap conforms to at least three sides of the controller and has an oblong aperture sized to allow access through the strap to a thumb control on the controller. Stabilizing side members may connect accessories including horns, bells, and mirrors to the flexible strap. The controller is configured to wirelessly connect to EPMDs. The taillight operates as a brake light.

26 Claims, 8 Drawing Sheets

(56) References Cited

U.S. PATENT DOCUMENTS

| | | | | |
|---|---|---|---|---|
| 2014/0091116 A1* | 4/2014 | Yu | A45F 5/00 224/218 |
| 2019/0033787 A1* | 1/2019 | Swanagin | A61B 5/681 |

* cited by examiner

HANDHELD CONTROLLER WITH SAFETY HARNESS ASSEMBLY

CROSS-REFERENCES TO RELATED APPLICATIONS

This application is a Non-Provisional Application that claims the benefit of prior Provisional Application No. 63/123,066 filed on Dec. 9, 2020, the contents of which are hereby incorporated by reference.

MICRO ENTITY STATUS

The applicant is claiming micro entity status for this application under a gross income basis. The applicant is including a signed Certification of Micro Entity Status (Gross Income Basis), Form PTO/SB/15A (07-14), with this application.

FIELD

The present disclosure relates to a handheld controller and a corresponding harness assembly, and more particularly to a safety handheld controller with a kit and a harness assembly that modifies handheld controllers with safety features for riders of electric personal mobility devices.

BACKGROUND

This section provides background information related to the present disclosure which is not necessarily prior art.

The use of electric personal mobility devices (EPMDs) has become both a popular recreational activity and a necessity for disabled persons. Government and non-profit organizations assistance, tax incentives, financing options, and health insurance coverage have made EPMDs more economically accessible. With the increase in production volume, the cost of EPMDs has decreased. With the proliferation of EPMDs, such as electric skateboards, various manufacturers have introduced conventional handheld controllers with basic functionality. However, there is room for improvement at least in terms of rider safety, flexibility, adaptability, ease of use, user access to the controller, and fitting to the user, the controller, and the EPMD.

There is need in the art for a controller that operates with different types of EPMDs, improves rider safety, improves the use and control of EPMDs, and a harness with additional safety features that improves rider safety, improves the use and control of EPMDs, and is adaptable to work with the many different styles of handheld controllers.

SUMMARY OF THE INVENTION

This section provides a general summary of the disclosure, and is not a comprehensive disclosure of its full scope or all of its features.

A harness assembly for securing safety accessories to a handheld controller for electric personal mobility devices generally includes a flexible strap that is perforated along its length, at least one connector that cooperates with a perforation in the flexible strap to releasably secure the flexible strap about the controller, and headlight and taillight mounts on the flexible strap. The flexible strap is adjustable in length or tightness about the controller to secure the headlight mount in a forward position and the taillight mount in a rearward position on the controller.

The flexible strap, which may comprise two or more pieces, conforms to at least three sides of an asymmetrically shaped handheld controller, and has an oblong aperture sized to allow access through the strap to a thumb control on the handheld controller. A headlight and taillight may be placed on their respective mounts.

A stabilizing side member may connect to the flexible strap and span the handheld controller from side to side, thus securing an accessory to the flexible strap and to the controller. Accessories include horns, bells, and mirrors, among others.

A handheld controller and harness assembly for securing accessories to the handheld controller generally includes a flexible strap structured to conform to at least three sides of an asymmetrically shaped handheld controller and perforated along its length, at least one connector that cooperates with a perforation in the strap to secure the strap about the handheld controller, and a wireless module inside the handheld controller. The handheld controller may include a display, a speaker, a camera, and/or a microphone, which may be wired or wirelessly coupled to the handheld controller and/or mechanically coupled to (or uncoupled from) either the handheld controller or the harness assembly.

The strap of the handheld controller and harness assembly, which may comprise two or more pieces, at least one of which is flexible, conforms to at least three sides of an asymmetrically shaped handheld controller, and has an oblong aperture sized to allow access through the strap to a camera and/or a thumb control on the handheld controller. A headlight and taillight may protrude from the controller, be placed on their respective mounts on the strap and/or the controller, or emit light through openings in the strap. The taillight may operate as a brake light of the EPMD.

The handheld controller generally has a computer device inside, which includes a processor, memory, and input/output module, and a wireless module. The modules are wired or wirelessly connected to wired and/or wireless cameras, sensors including microphones and biosensors, displays, speakers, mobile devices, lights, buttons, controls, the internet, and/or the like. The speaker may be configured to operate as a horn or a bell, or may be a headphone or earphone or head-mounted audio device wired or wirelessly coupled to the handheld controller through the corresponding module. The wireless module inside the handheld controller is generally configured to wirelessly communicate with an electronic personal mobility device (EPMD) and/or to other devices via Bluetooth®, Wi-Fi®, and/or the like.

A kit for securing accessories to a handheld controller generally includes at least one flexible strap that is perforated along its length with an oblong aperture sized to allow access through the at least one strap to a thumb control on the handheld controller, at least one connector that cooperates with a perforation in the flexible strap to secure the strap about the handheld controller, a headlight assembly, and a taillight assembly. The kit may also include a horn or bell mount, a mirror mount, and a variety of horns, bells, and mirrors.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

A more complete understanding of these embodiments, and the attendant advantages and features thereof, will be more readily understood by reference to the following detailed description when considered in conjunction with the accompanying drawings. The drawings described herein may not be to scale, are for illustrative purposes only of selected embodiments and not all possible implementations, and are not intended to limit the scope of the present disclosure.

For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

Corresponding reference numerals indicate corresponding parts throughout.

DETAILED DESCRIPTION

Figure 1:
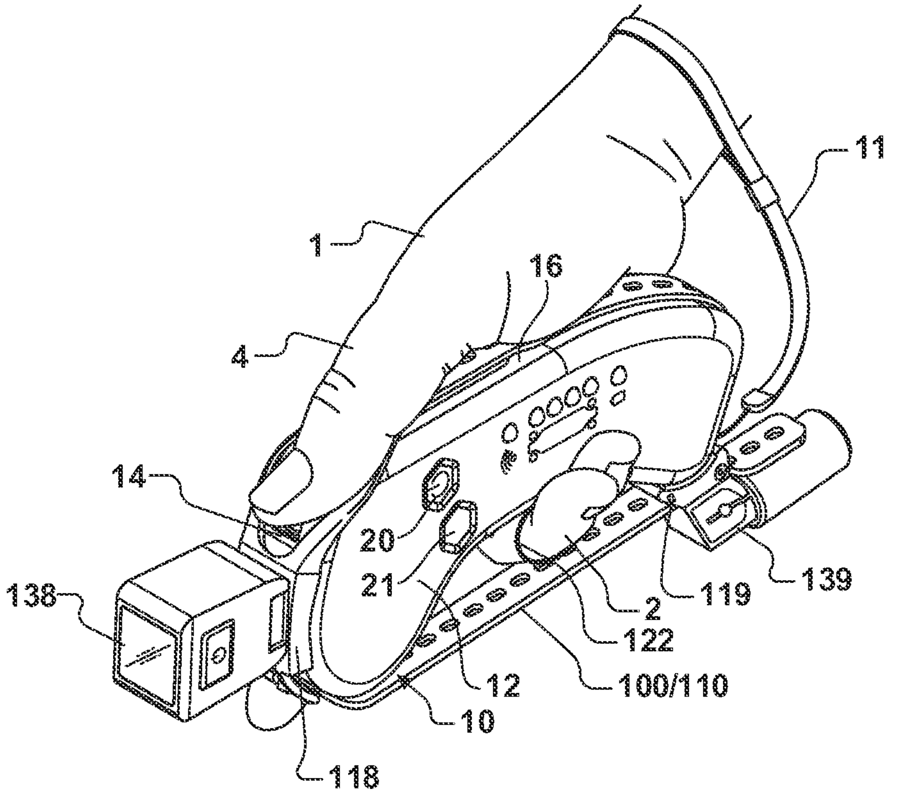
FIG. 1 is a front perspective view of a handheld controller with harness assembly.
Figure 2:
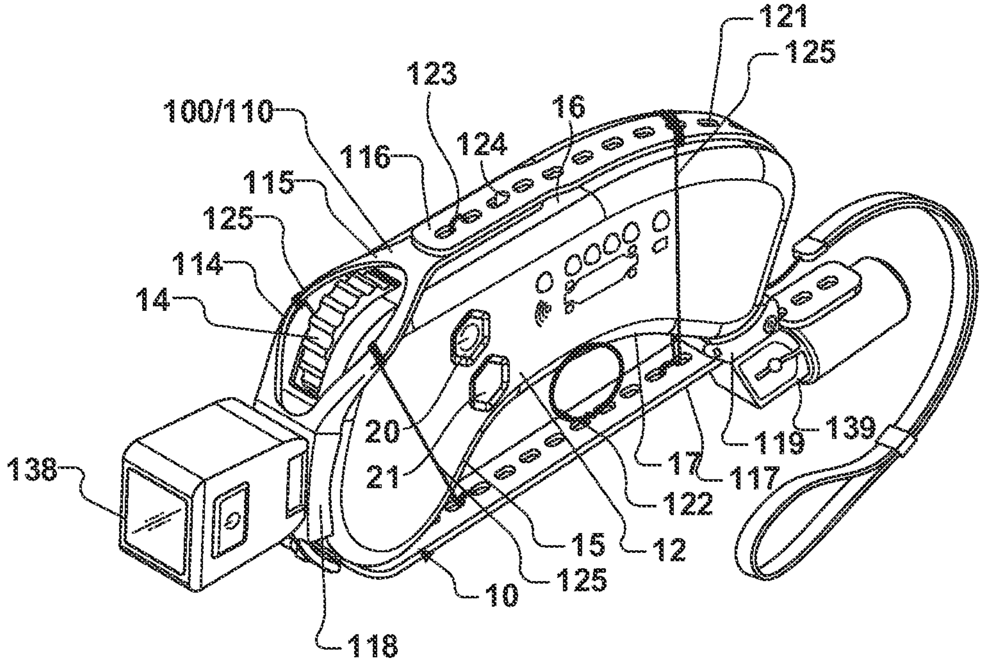
FIG. 2 is the same view as FIG. 1.
Figure 3:
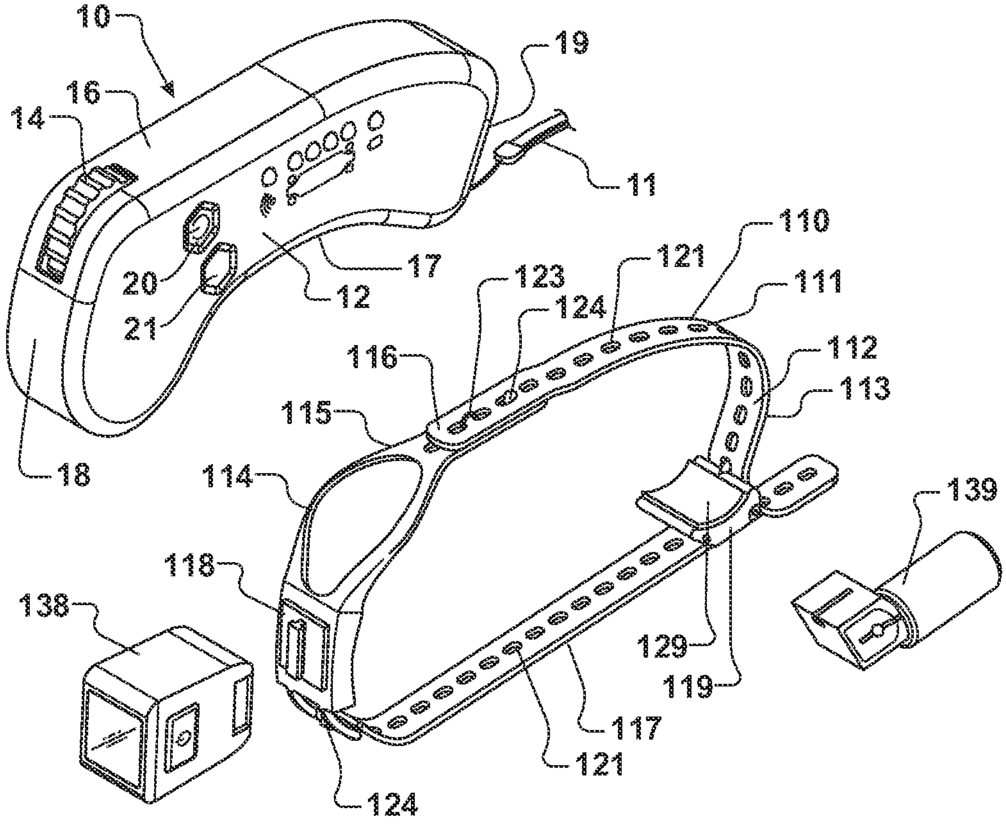
FIG. 3 is an exploded view of FIG. 2.
Figure 4:
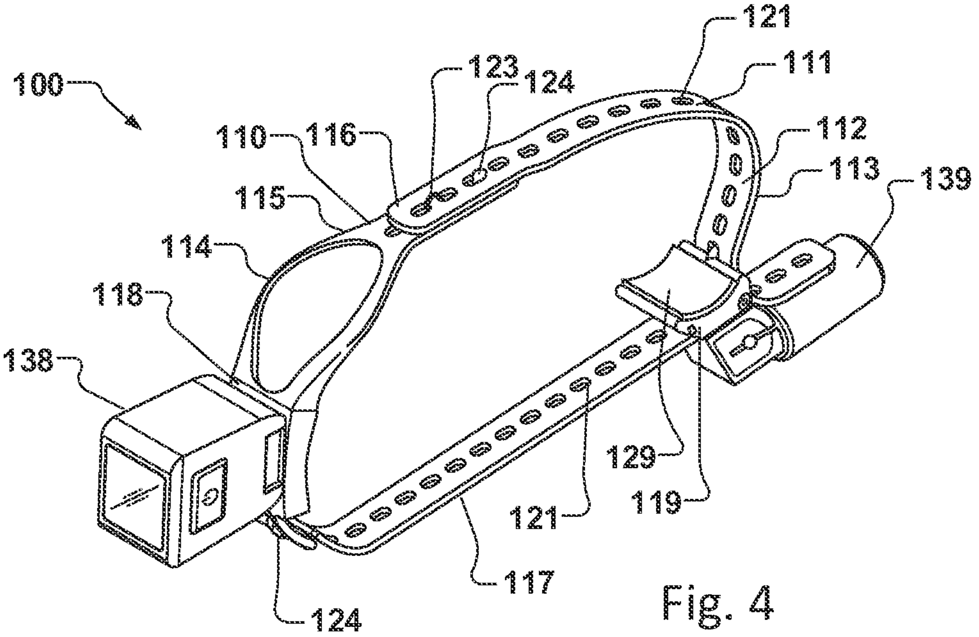
FIG. 4 is the harness assembly of FIG. 2.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

As used herein, relational terms, such as "first" and "second," "top" and "bottom," "forward" and "rearward," and the like, may be used solely to distinguish one entity or element from another entity or element without necessarily requiring or implying any physical or logical relationship or order between such entities or elements.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated.

In describing preferred and alternate embodiments of the technology described herein, specific terminology is employed for the sake of clarity. The technology described herein, however, is not intended to be limited to the specific terminology so selected, and it is to be understood that each specific element includes all technical equivalents that operate in a similar manner to accomplish similar functions.

Example embodiments will now be described more fully with reference to the accompanying drawings. Specific details are set forth such as examples of specific components and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known device structures are not described in detail.

With reference to FIGS. 1-14, in recent years manufacturers have fitted electric personal mobility devices (EPMDs) such as skateboards, hoverboards, caster boards, vigorboards, waveboards, skates, and uniwheel devices with motors and lights. However, lights at road level can be hard for car drivers to see. Also, such EMPDs do not have handlebars, and they lack the variety of functions and control enabled by handlebars.

The present Application improves upon existing products to provide for rider safety and comfort, giving riders more visibility and "presence" in bike lanes as they operate in close proximity to cars. Harness assembly 100 essentially places a bike grip in the users hand and loads that one grip with a full suite of modular safety functions, which may include headlights and taillights—in-hand and above street level, bell, horn, mirror, watch/phone, GPS, fitness monitor, mace, and more.

As illustrated in FIG. 1, prior art remotes or controllers 10 are designed to fit within a rider's hand 1, typically with a control-side 12 facing away from the rider's palm. Various controls are within reach of the rider's index finger or thumb 4, including a trigger (shown elsewhere) and thumb throttle wheel or thumb control 14 typically found on the controller's spine or top side 16. The rider's other fingers 2 may fit comfortably under the bottom side 17. As illustrated, most controllers 10 are asymmetrical with a crescent, kidney, or "dogleg" shape, with manufacturers differently defining ergonomic fit.

Looking at FIGS. 1-9, the harness assembly 100 and harness strap 110 of the present Application are structured to stretch and snugly surround any existing remote, with a universal fit. In general, the harness strap 110 is a flexible, perforated strap of plastic, rubber, composite or other material suitable to the function of conforming to at least several sides 16, 18, 19 of the controller 10, but may not conform to other sides 17. As shown, nonconformance to the bottom side 17 of the handheld controller 10 creates a gap or "finger crevice" between that bottom side 17 and the bottom strap piece 117, allowing the fingers to reach controls such as the power button 20, gear shifts, etc. The flexibility of the harness strap 110 also insulates the controller 10 against damage from crashes.

The bridle or harness strap 110 may be one piece or comprise two or more straps or pieces 115, 116, 117, at least one of which is flexible, secured to one other by links, hooks or rings 123, tabs or nubs 124, lashing 125, or other connectors that are typically releasable to enable flexible modification and reconfiguration via a multitude of holes 121 of varying sizes. Not all connectors (123, 124, 125) must be releasable. Of particular importance, the controller's thumb control 14 is accessible through a large, typically oblong aperture 114 demarcated by the inner edges 114 of the aperture. The harness strap 110 has an outer surface 111, inner surface 112, and outer edge 113.

In a preferred embodiment, the harness strap 110 is fitted with a front light or headlight mount 118 and rear light or taillight mount 119 made of hard, flexible, or composite materials with interior curvatures 128 and 129 or saddles, respectively, that abut the front end 18 and rear end 19 of the controller 10. Headlight 138 is attached to headlight mount 118 to form a headlight assembly, and each of those terms at times may be used interchangeably. Taillight 139 is attached to taillight mount 119 to form a taillight assembly, and each of those terms at times may be used interchangeably. The flexibility of the harness strap 110, combined with the various perforations 121 and connectors (123, 124, 125), allows the harness assembly 100 to be adjusted in length and tightened around the controller 10 to secure the headlight mount 118 in a forward position and the taillight mount 119 in a rearward position. The terms headlight and taillight are utilized for easy distinction, but one of skill in the art will realize that the front light and rear light may be lights other than headlights and taillights, such as blinkers or hazard lights. The controller 10, lights 138 and 139, and any other powered attachments may be charged or powered separately or together depending upon their design.

In practice, a user sizes and tightens the harness strap 110 about the controller 10 and turns the lights 138, 139 on prior to riding, or even jogging. In addition to the controller's wrist strap 11, the rider's finger 2 may be placed in a "finger grip" projection or ring 122 on the harness strap 110 to secure the harness assembly 100. The safety lights 138, 139 are now at body level and visible to vehicles that occupy the same streets. (Waving and pointing the light acts as a turn signal.) To switch to a different EPMD operated by a different controller 10, the rider simply loosens the harness strap 100 and refits it around the other controller 10.

Figure 5:
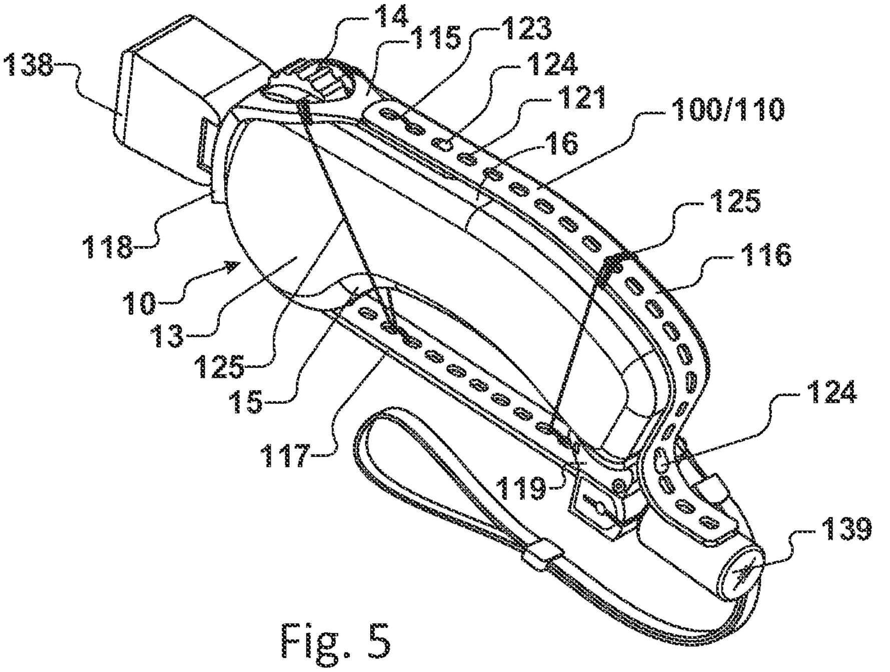
FIG. 5 is a rear perspective view of a left-handed controller with harness assembly of FIG. 2.
Figure 6:
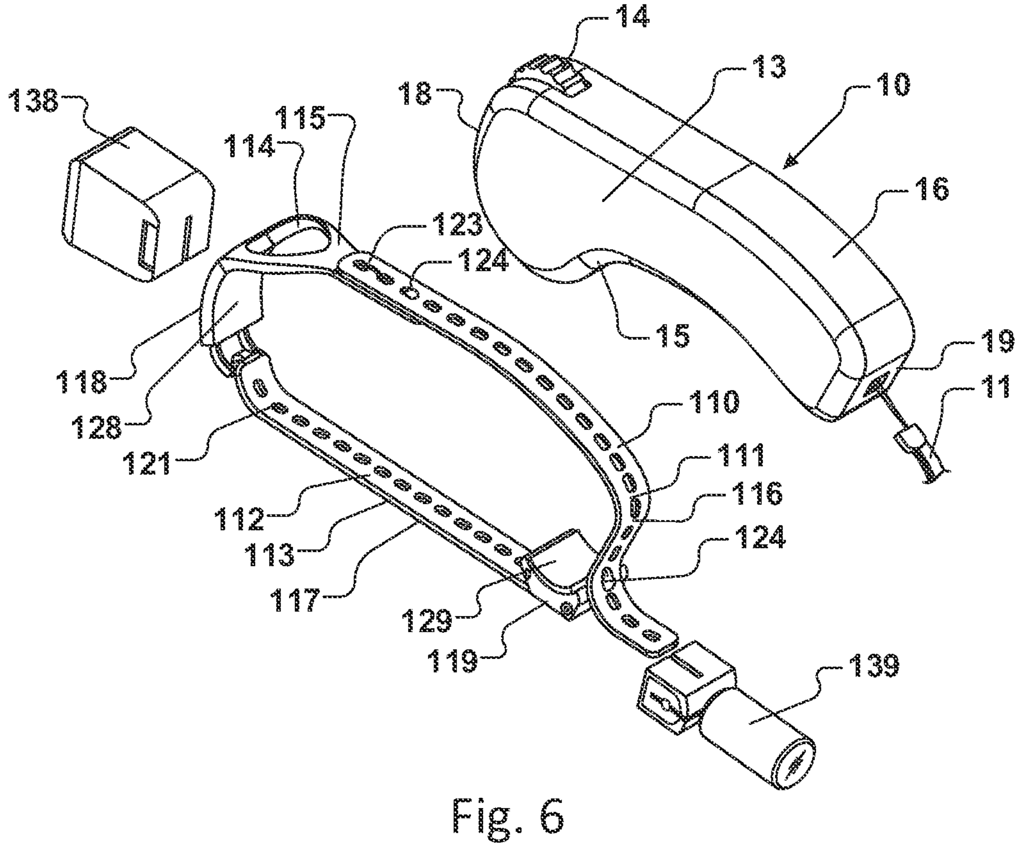
FIG. 6 is an exploded view of FIG. 5.
Figure 7:
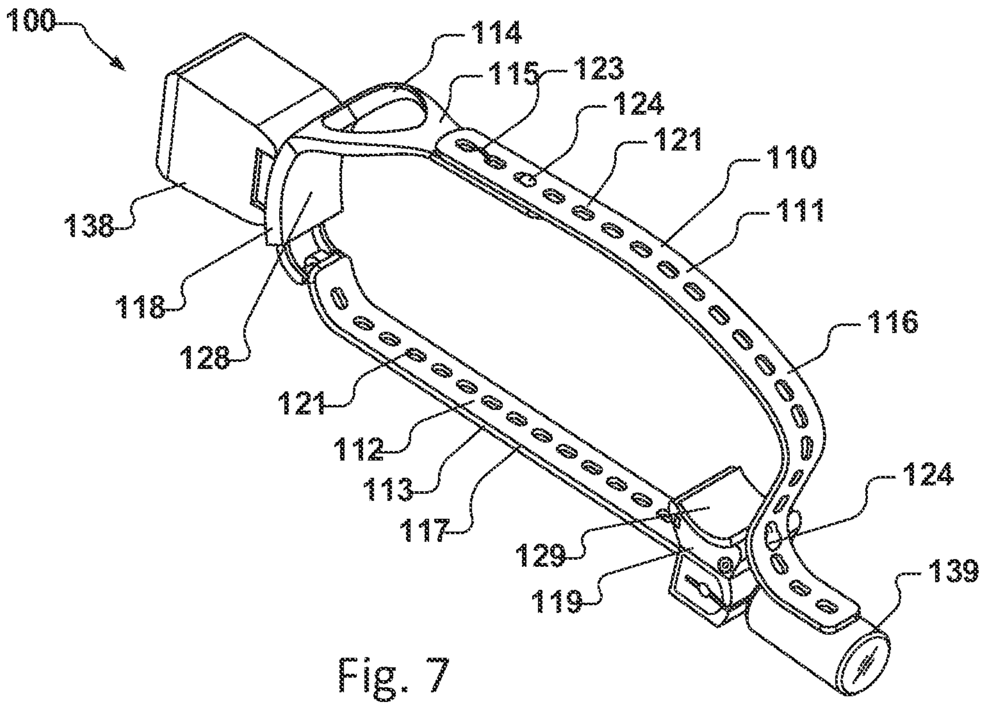
FIG. 7 is the harness assembly of FIG. 5.

Whereas FIGS. 1-4 show a control-side 12 view as used by a right-handed rider, FIGS. 5-6 show a palm-side 13 view as configured for a left-handed rider. Trigger 15 is more evident.

Figure 8:
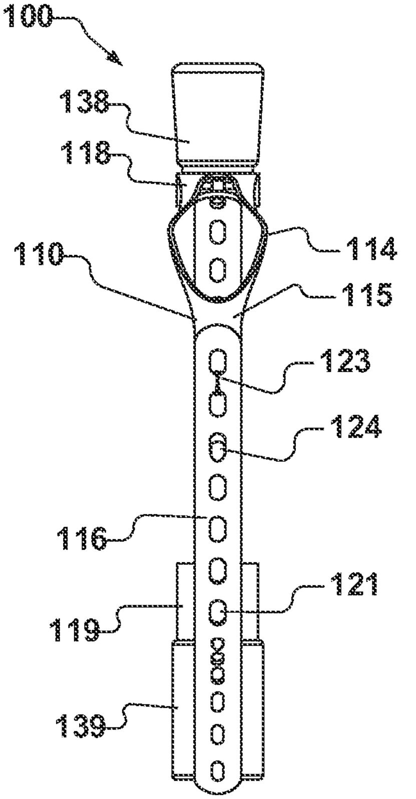
FIG. 8 is a top view of the harness assembly of FIGS. 2 and 5.
Figure 9:
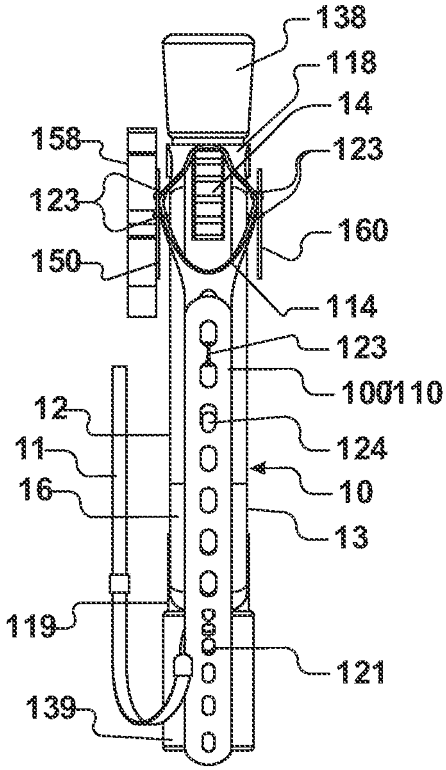
FIG. 9 is FIG. 8 showing controller in harness assembly with bell and mirror.

FIG. 8 is the top view of the harness assembly 100 comprising the harness strap(s) 110, headlight 138, and taillight 139. FIG. 9 is the same view, with a bell 158 on the left and a mirror on the right 160. The controller 10 is also in place, with its thumb control 14 evident and loosely framed by the inner edges 114 of the thumb control aperture 114.

FIGS. 10-13 illustrate stabilizing side members 151 that function to further secure the harness strap(s) 110 and controller 10 and to provide structural support for accessory attachments, which may be safety features or for other uses. Stated another way, stabilizing side member 151 connects to a first perforation 121 on a first portion of the flexible harness strap 110 that corresponds to a first side (usually 16) of the handheld controller and connects to a second perforation 121 on a second portion of the flexible harness strap 110 that corresponds to a second side (usually 17) of the handheld controller 10. Once the flexible harness strap 110 is fitted to the controller 10, the stabilizing side member 151 spans the controller 10 from the first side to the second side.

Figure 10:
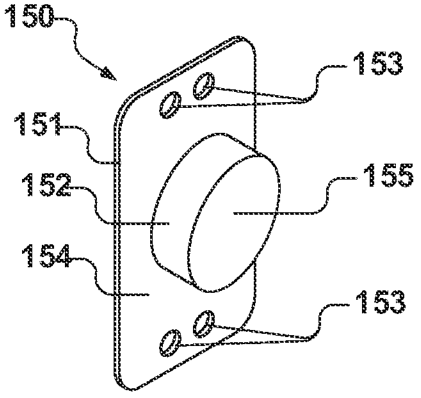
FIG. 10 is a perspective view of a bell mount.

In FIG. 10, horn or bell mount 150 comprises a stabilizing side member 151 that is a plate with a cylinder 152 on the stabilizing side member face 154. The cylinder 152 is sized to hold a bell 158 as a handlebar would. The cylinder 152 may be hollow. Cylinder face 155 may comprise a reflector. The bell mount 150 is attached to the harness strap 110 via apertures 153 using rings 123, lashing 125, or similarly functional attachment. The bell 158 is mounted on the bell mount 150 on the harness strap 110. Importantly, the horn or bell 158 is attached firmly enough to be operated without invasive attachment that might damage the controller 10. The particular bell 158 shown requires a firm press on a spring-loaded lever, so attachment to the harness assembly 100 must be sturdy. Other varieties of horns and bells 158 may be mounted in other ways on a stabilizing side member 151. One of skill in the art will understand that at times the terms bell mount, cylinder, and even stabilizing side member for the bell may be used interchangeably when describing mounting of the bell 158.

Figure 11:
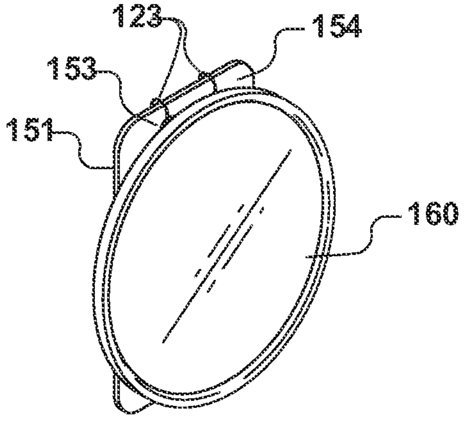
FIG. 11 is a perspective view of a mirror mount.
Figure 12:
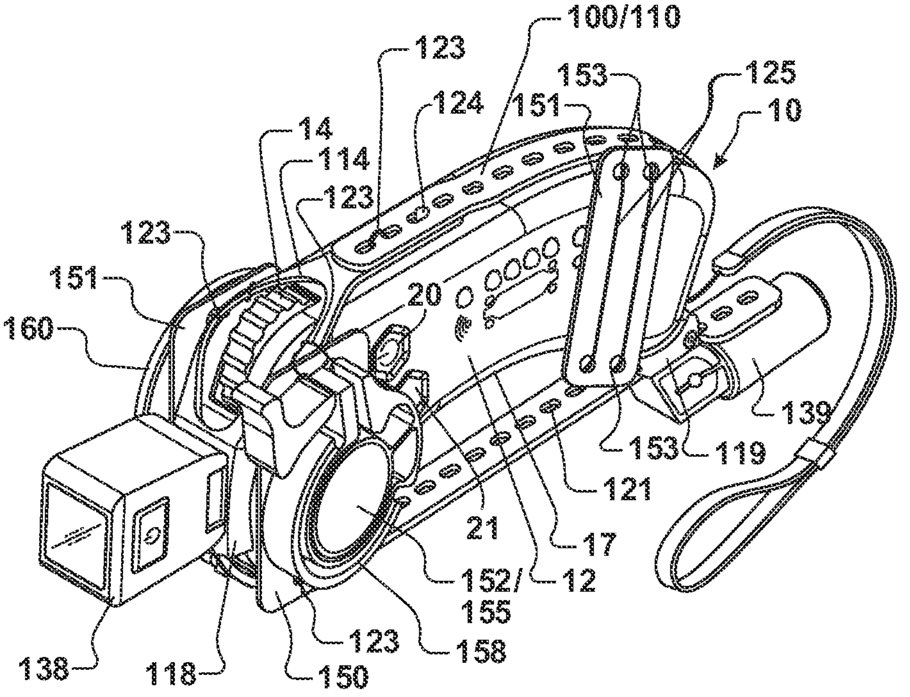
FIG. 12 is the front perspective view of FIG. 2 with bell and mirror.
Figure 13:
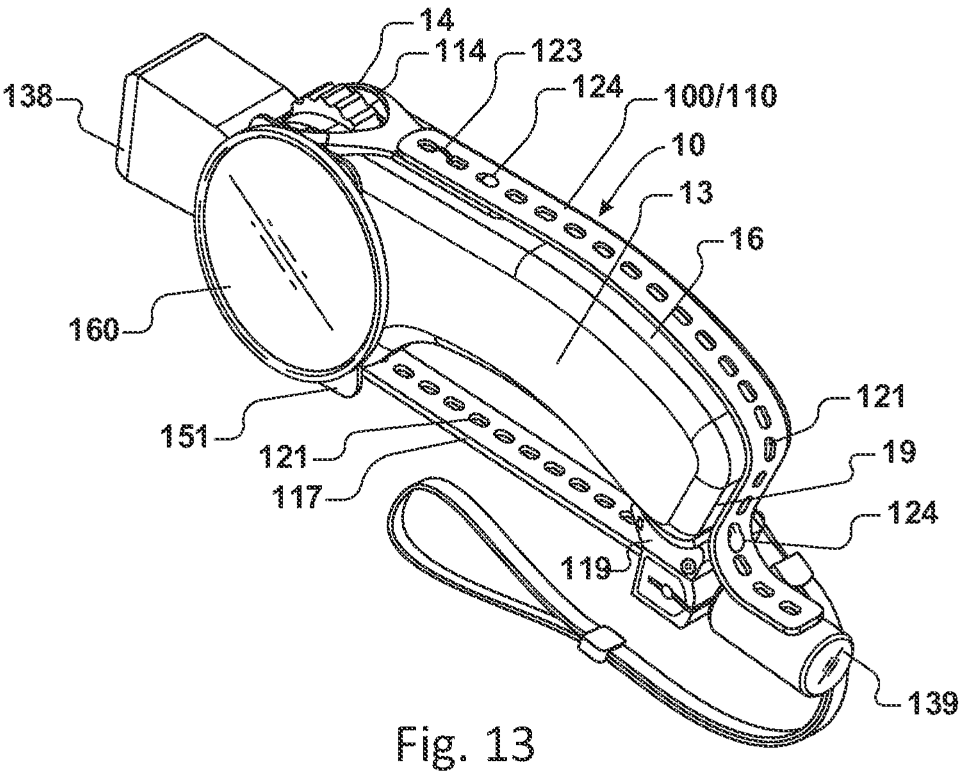
FIG. 13 is the rear perspective view of FIG. 5 with mirror.
Figure 14:
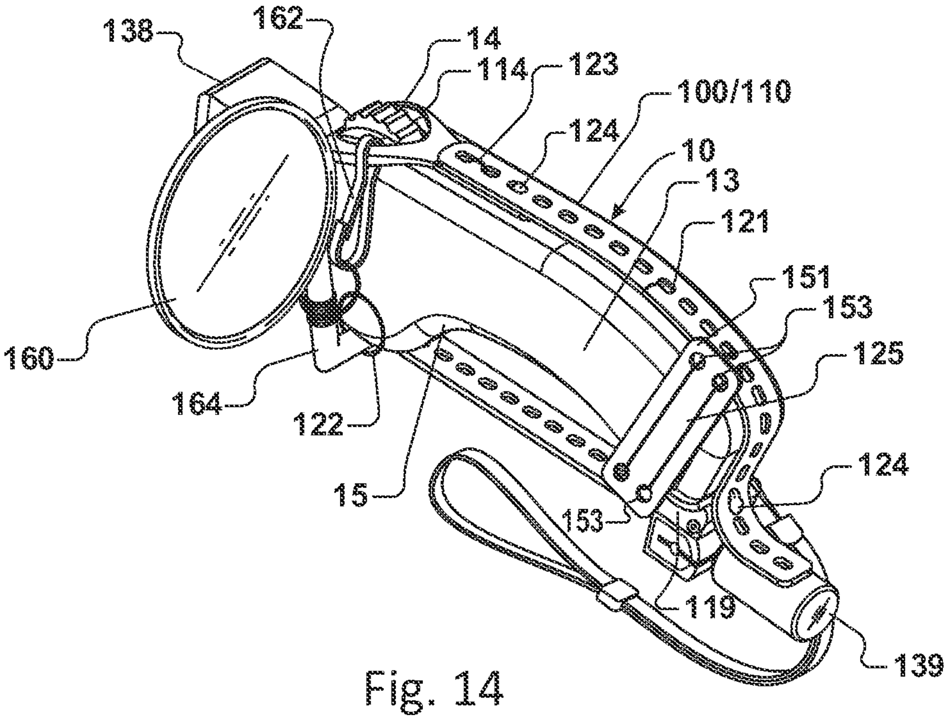
FIG. 14 is FIG. 13 with extended mirror.

FIGS. 11-13 show a mirror 160 mounted on the face 154 of a stabilizing side member 151, and likewise attached to the harness strap 110 via apertures 153. One or more stabilizing side members 151 serve to keep the controller 10 from sliding out of the harness strap 110 and allow the rider increased freedom and safety. Also shown in FIGS. 12 and 14 is a flat stabilizing side member 151 attached with lashing 125 without a mounted accessory. Stabilizing side members 151 are not limited to the number, shapes, or accessories shown. FIG. 14 illustrates mirror 160 on a side-arm 164 supported by rings 122 and clips 162, which may be metal or plastic, but are not limited to those materials. One of skill in the art will understand that at times the terms mirror, mirror mount, and even stabilizing side member for the mirror may be used interchangeably when describing mounting of the mirror 160.

Figure 15:
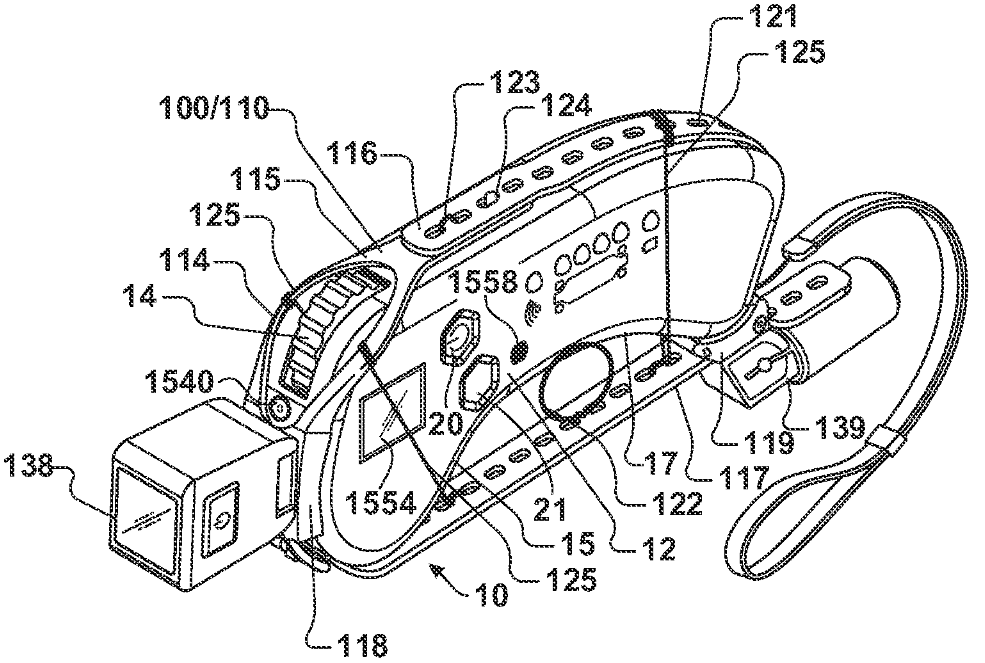
FIG. 15 is a front perspective view of a handheld controller with harness assembly.

FIG. 15 shows a new and novel controller 1510 incorporating the characteristics of controller 10. The controller 1510 also has a camera 1540, a microphone (not shown), a display 1554, and/or a speaker 1558. FIG. 15 shows the camera 1540 is located at the front side 18 of the controller 1510. The camera 1540 takes photos and/or videos. In some embodiments, controller 1510 may have the camera 1540 at other locations and/or may have more than one camera 1540. In some embodiments, controller 1510 is fitted with a microphone (not shown) to enable capturing or recording audio by itself and capturing video with audio. Audio, video, and/or photo inputs captured by the camera 1540 and/or the microphone are stored in the local memory and/or database of controller 1510, in a database in the cloud, or in a combination of the memory, database, and/or cloud database, as further discussed below. In a preferred embodiment, speaker 1558 is configured to sound off a bell and/or a horn (through the speaker 1558 and/or a wireless speaker) based on or in response to input from a user/rider. The input from the rider to sound off the bell and/or horn may be the pressing of one or more buttons (in FIG. 15 shown as button 21), pressing the trigger 15, pressing the touch screen 1554 and/or rolling the thumb control 14.

Controller 1510 is configured to replay recorded images and/or videos (including the video, and/or photo inputs) through a display 1554 and/or a wireless display. Likewise, controller 1510 is configured to replay recorded sounds and audio (including the recorded audio inputs) through a speaker 1558 and/or a wireless speaker. In some embodiments, a new and novel version of controller 1510 that does not have a camera, microphone, display, or speaker, is configured to connect to one or more mobile devices (with displays, cameras, microphones, and/or speakers), mobile phones, wireless cameras, wireless speakers, wireless displays, and/or wireless microphones. Controller 1510, when having and when not having a camera, microphone, display, and/or speaker, is configured to record audio and video with the wired and/or wireless input devices (the wireless camera and the wireless microphone). Similarly, controller 1510, when having and when not having a camera, microphone, display, and/or speaker, is configured to play audio and/or video through the wired and/or wireless output devices (including the wired and the wireless displays and speakers). Whether wired or wireless, camera 1540 includes any type of photo and/or video camera, including optical cameras, digital cameras, image sensors, DSLR (digital single-lens reflex cameras), mirrorless cameras, point-and-shoot cameras, sport cameras, and/or the like. Whether wired or wireless, microphones include any type of sound or audio recording device, including directional microphones, non-directional microphones, smart home microphones, and/or the like. Whether wired or wireless, displays includes any type of screen or displays, including mobile phone displays, tablet displays, laptop displays, smart home displays, touch screen displays, liquid crystal displays (LCD), light-emitting diode display (LED), LED backlit LCD, thin film transistor LCD, quantum dot LED displays (QLED), organic LED (OLED), active matrix OLED (AMOLED), and/or the like. Whether wired or wireless, speakers include any type of speaker or sound producing device, including headphones, earphones, smart home speakers, mobile phone speakers, portable speakers, acoustic speakers, directional speakers, and/or the like. The recording and/or playing of audio and/or video may be operated by a rider by the pressing of the button 21, pressing the trigger 15, pressing the touch screen 1554 and/or rolling the thumb control 14.

In some embodiments, controller 1510 switches between modes for recording audio and/or video, playing audio and/or video, and/or sounding of a bell and/or horn by the pressing of a button, pressing the trigger 15, pressing the touch screen 1554 and/or rolling the thumb control 14. For example, in some embodiments, a rider presses and holds trigger 14 while rolling the thumb control 14 to switch between modes, with the display screen 1554 showing the current mode. When the desired mode appears on the screen 1554, the rider releases the trigger 15 to select the desired mode. To operate the desired mode, the user presses (without holding) the trigger 15. Note that any combination of inputs may be used to switch between modes and/or operate controller 1510.

In preferred embodiments, controller 1510 includes electronic components (not shown) that enable wireless connectivity, such as Bluetooth®, Wi-Fi® (IEEE 802.11 protocols), private and/or proprietary wireless protocols and connectivity, cellular and mobile phone communication, internet connectivity, internet hot-spot connectivity, cellular and mobile data (including internet connectivity), and/or the like. Cloud includes, but is not limited to, any software, platform, infrastructure, software-as-a-service, platform-as-a-service, and/or infrastructure-as-a-service, that provides access to actual or virtual servers, software, and databases via the internet through layers of software, applications, communication protocols, interfaces, APIs (application programming interfaces), webhooks, websockets, and/or the like.

Figure 16:
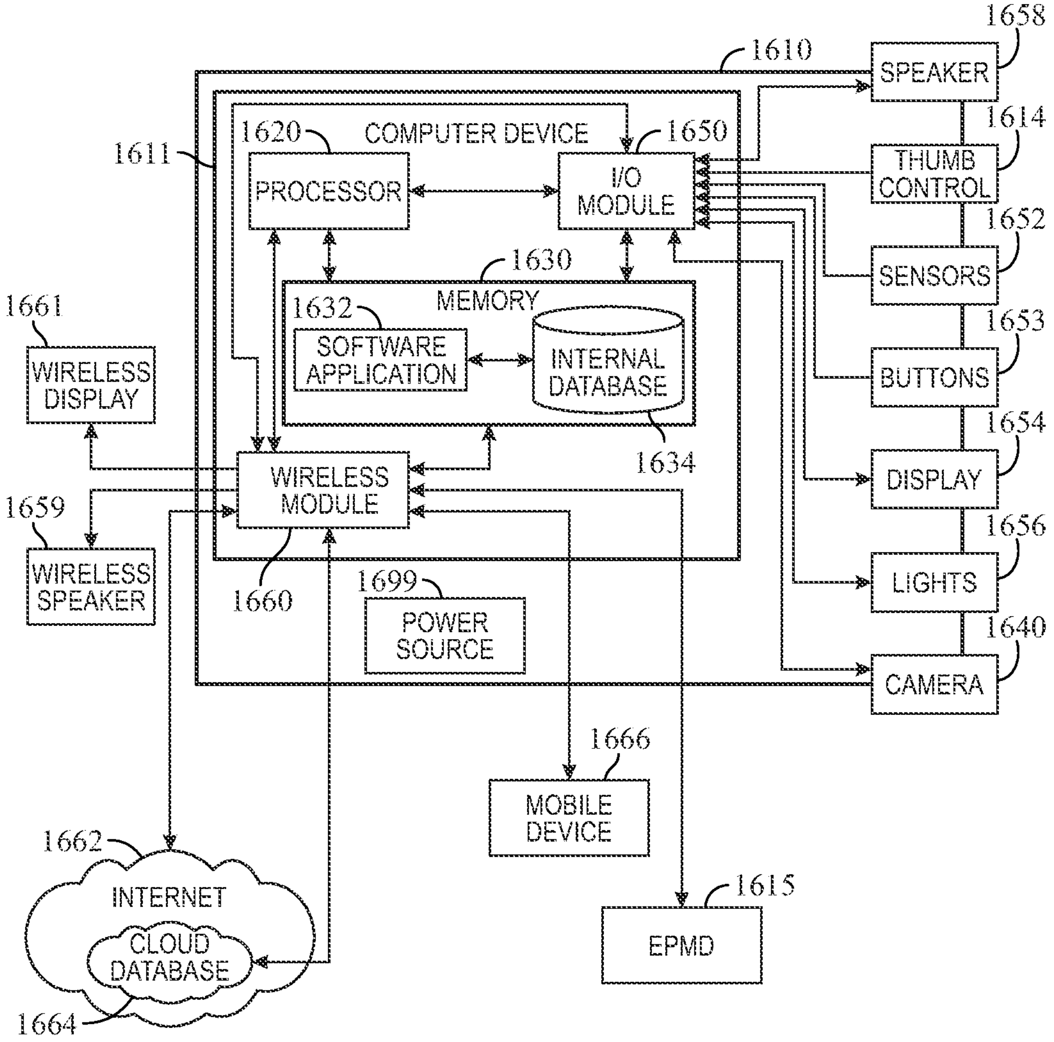
FIG. 16 is a block diagram of a controller with a computer device and peripheral components.

FIG. 16 is a block diagram of controller 1610 incorporating the features of controller 1510 of FIG. 15, with a computer device 1611 that may be included inside controller 1510 [1610], according to various embodiments of the present invention. FIG. 16 shows a computer device 1611 inside controller 1610. The computer device 1611 includes a processor 1620, a memory 1630, an input/output (I/O) module 1650, and a wireless module 1660. The processor 1520 may include a central processing unit (CPU) with one or more cores, multiple CPUs, a digital signal processing unit (DSP), a graphics processing unit (GPU), one or more microcontrollers, and/or the like. The processor 1620 sends and receives information from the memory 1630, the I/O module 1650, and/or the wireless module 1660. The memory 1630 may include a buffer, RAM, ROM, EPROM, and/or the like. The wireless module 1660 enables wireless connectivity, such as Bluetooth®, Wi-Fi® (IEEE 802.11 protocols), private and/or proprietary wireless protocols and connectivity, cellular and mobile phone communication, internet connectivity, internet hot-spot connectivity, cellular and mobile data (including internet connectivity), and/or the like Software application 1632 within memory 1630 may be executed by processor 1620 to implement the overall functionality of computer device 1611, and thus coordinate the operation of controller 1610 as a whole. The execution of the software application may include reading and/or writing data or information from/to an internal database 1634 that also resides in memory 1630, reading and/or writing data or information from/to a cloud database 1664, or both. In some embodiments, the execution of the software application 1632 may include sending and/or receiving signals to/from inputs and/or outputs through the I/O module 1650, including thumb control 1614 (which incorporates the features of thumb control 14), sensors 1652 (including microphones, biometric sensors, and any other types of sensors, including those mentioned in this application), buttons 1653 (which incorporates the features of power button 20 and/or button 21), display 1654 (which incorporates the features of display 1554), lights 1656 (which incorporates the features of lights 138 and/or 139), speaker 1658 (which incorporates the features of thumb control 14), camera 1640 (which incorporates the features of camera 1540), and/or the like. In some embodiments, the execution of the software application 1632 may include sending and/or receiving signals to/from inputs and/or outputs through the wireless module 1660, including EPMD 1615, wireless speaker 1659, wireless display 1661, internet 1662, cloud database 1664, mobile device 1666, and/or the like. The inputs and/or outputs that connect with the I/O module 1650 may also be implemented as wireless devices that connect with the wireless module 1660. The inputs and/or outputs that connect wirelessly with the wireless module 1660 may also be implemented as wired devices that connect with the I/O module 1650. The wired input and output devices connected with the I/O module 1650 may be powered by the power source 1699, by their own independent power source, or both. For example, referring to FIG. 15, light 138 may have its own power source and/or be electrically coupled to the power source 1699 of the controller 1510 [1610] through an electrical connector of the headlight mount 118 (not shown) that connects to an electrical connector of the front side 18 (not shown). The power source 1699 may be batteries, rechargeable batteries, photovoltaic cells, a kinetic power generator/collector, and/or the like.

Camera 1640 is configured to capture photos and/or video. Sensors 1652 may include a microphone that captures audio. In some embodiments, the rider may use software application 1632, through I/O module 1650, to capture images and/or video with camera 1640, and/or sound with microphone sensor 1652, which send image, video, and/or audio signals to I/O module 1650. To store the image, video, and/or audio, the software application 1632 causes I/O module 1650 to transform the image, video, and/or audio signals to image, video, and/or audio data and to send the image, video, and/or audio data to memory 1630. In some embodiments, the software application 1632 causes I/O module 1650 to send the image, video, and/or audio data to wireless module 1660, and causes wireless module 1660 to send the image, video, and/or audio data to the cloud database 1664 through the interne 1662. In some embodiments, for replay, the rider may cause software application 1632 to send image, video, and/or audio data from either a recorded image, video, and/or audio in memory 1630 and/or in the cloud database 1664 (for example, image, video, and/or audio data stored in database 1634 and/or cloud database 1664) to I/O module 1650, and to cause I/O module 1650 to send an image, video, and/or audio signal to display 1654 and/or speaker 1658. In some embodiments, for replay, the rider may use software application 1632 to send image, video, and/or audio data from either a recorded image, video, and/or audio in memory 1630 and/or in the cloud database 1664 (for example, image, video, and/or audio data stored in database 1634 and/or cloud database 1664) to wireless module 1660, and to cause wireless module 1660 to send an image, video, and/or audio signal to wireless speaker 1659, wireless display 1661, and/or mobile device 1666. In some implementations, the rider may use software application 1632 to cause I/O module 1650 to trigger camera 1640 and/or microphone sensor 1652 to capture audio and/or video, and to replay the audio and/or video in real-time through wireless speakers 1659, wireless display 1661, speakers and/or display of mobile device 1666, display 1654, and/or speaker 1658 via I/O module 1650 (for wired components) and/or via wireless module 1660 (for wireless components).

In an exemplary operation of controller 1610, the software application 1632 automatically starts running after the controller 1610 is turned on by pressing a button 1653 that triggers a turn-on signal (such as power button 20 in FIG. 15). The software application 1632, through processor 1620, causes wireless module 1660 to search for, become available for, and/or receive a connection signal from EPMD 1615. Once the wireless connection handshake occurs and communication between the wireless module 1660 and the EPMD 1615 is established (for example, a Bluetooth® connection between the wireless module 1660 and the EPMD 1615), the wireless module 1660 receives a wireless signal with the status and operation of the EPMD 1615. In some embodiments, at startup and/or during operation of the EPMD 1615, if the wireless signal from EPMD 1615 indicates that the EPMD 1615 is not operational or should not be operated, the software application 1632 sends an audio and/or visual alarm signal to the wireless speakers 1659, the speakers and/or display of the mobile device 1666, and/or any other wireless output display or device through the wireless module 1660. In some embodiments, at startup and/or during operation of the EPMD 1615, if the wireless signal indicates that the EPMD is not operational or should not be operated, the software application 1632 sends an audio and/or visual alarm signal to the wired speakers 1658, the display 1654, and/or any other wired output display or device through the I/O module 1650.

Referring back to FIG. 15, light 139 may operate as a brake light that indicates to other travelers, cars, and the like, that the user of the EPMD 1615 and the controller 1510 [1610] are decelerating, reducing speed, stopping, and/or fully stopped. When the controller 1510 [1610] receives a signal indicating that the EPMD 1615 is decelerating, decreasing acceleration, reducing speed, and/or when the software application 1632 determines that the EPMD 1615 is decelerating (for example, based on the EPMD 1615 having a current speed/velocity that is lower than the previous speed/velocity, with the current and previous speeds/velocities being stored in the internal database 1634), the software application 1632 sends a signal to the I/O module 1650 to cause the light 139 [tail light/brake light 1656] to turn on. As brake lights are typically color red, light 139 may illuminate with red by having a red color filter, being configured to turn on light emitting diodes that emit red light, and/or setting a multicolor light output to the color red. When the EPMD 1615 starts to move again, the software application 1632 sends a signal to the I/O module to cause the light 139 [taillight/brake light 1656] to turn off and/or stop emitting red light.

Sensors 1652 may include heart rate sensors, galvanic skin response sensors, and/or other biometric sensors (not shown in FIGS. 1-15). In execution, software application 1632 receives biometric data from I/O module 1650 based on biometric signals from biometric sensors 1652, including heart rate data. The user may interact with buttons 1652 to cause software application 1632 to send display information containing biometric data to the I/O module 1650 and/or the wireless module 1660, which in turn send display signals to the display 1654 and/or to a wireless display, respectively.

The descriptions of the embodiments disclosed above may be modified into different embodiments by exchanging components. For example, in some embodiments, one or more components of the controller 10 [1510, 1610] are included or incorporated in an electronic harness assembly that incorporates the characteristics of the harness assembly 100 and one or more characteristics of the controller 10 [1510, 1610]. In some embodiments, the electronic harness assembly includes components of or the whole computer device 1611 and/or power source 1699. This expanded, electronic harness assembly is able to communicate wirelessly (via Bluetooth®, Wi-Fi®, and/or the like) with the controller and/or EPMDs such as the EPMD 1615. In some embodiments, a harness camera incorporating the characteristics of the camera 1540 [1640] is physically and directly coupled to the electronic harness assembly. Some electronic harness assemblies include devices incorporating the characteristics of computer device 1611 to operate the harness camera. Some electronic harness assemblies are wirelessly and/or electrically coupled to the computer device 1611, generally through the wireless module 1660 and/or the I/O module 1650. In some embodiments, the harness assembly 100 connects electronically to the controller 10 [1510, 1610], such that a power source in the harness assembly 100 incorporating the characteristics of power source 1699 transmits power to the controller 10 [1510, 1610] for operation and/or for recharging. In other embodiments, one or more components of the harness assembly 100 are incorporated into an expanded controller that incorporates the characteristics of the controller 10 [1510, 1610] and one or more characteristics of the harness assembly 100.

In another embodiment, a controller 10 [1510, 1610] may physically incorporate the components of the harness assembly 100, such that the controller 10 [1510, 1610] and the harness assembly 100 are one object, making an assembly-incorporated controller. In some embodiment, the surface of the assembly-incorporated controller has one or more regions where at least part of surface of the harness assembly 100 and at least part of the surface of the controller 10 [1510, 1610] are both the same as a region of the one or more regions of the surface of the assembly-incorporated controller. In some embodiment, the surface of the harness assembly 100 is at least partially continuous with the surface of the controller 10 [1510, 1610] and the harness assembly 100 is not separable from the controller 10 [1510, 1610]. In some embodiments, strap piece 117 is flexible, with a first end of the strap piece 117 physically coupled to the controller 10 [1510, 1610], at least part of the length of the strap piece 117 physically uncoupled from the controller 10 [1510, 1610], and a second end of the strap piece 117 being attachable to the controller 10 [1510, 1610].

One of skill in the art will understand that shapes, sizes, quantities, functions, and placement of specific buttons, triggers, switches, and the like—as well as the electronics within and connecting the components described—may be altered and still meet the functionality of the present invention, even if certain changes increase or reduce cost or utilize technology other than that expressed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A harness assembly for securing accessories to a handheld controller, the harness assembly comprising:

(a) a strap that is perforated along its length, with at least part of the strap being flexible;

(b) at least one connector that cooperates with a perforation in the strap to secure the strap about the handheld controller;

(c) a headlight mount on the strap; and (d) a taillight mount on the strap;

wherein the strap is adjustable in length or tightness about the handheld controller to secure the headlight mount in a forward position and the taillight mount in a rearward position on the handheld controller;

further comprising a stabilizing side member that connects to a first perforation on a first portion of the strap that corresponds to a first side of the handheld controller and connects to a second perforation on a second portion of the strap that corresponds to a second side of the handheld controller, wherein after the strap is fitted to the handheld controller the stabilizing side member spans the handheld controller from the first side to the second side.

2. The harness assembly of claim 1, wherein the strap of claim 1 is structured to conform to at least three sides of an asymmetrically shaped handheld controller.

3. The harness assembly of claim 1, wherein the strap of claim 1 comprises at least two straps, at least one of which is flexible.

4. The harness assembly of claim 1, further comprising a headlight and a taillight.

5. The harness assembly of claim 1, further comprising an oblong aperture on the strap sized to allow access through the strap to a thumb control on the handheld controller.

6. The harness assembly of claim 1, further comprising a stabilizing side member that secures an accessory to the strap.

7. The harness assembly of claim 1, further comprising a horn or bell mount or a mirror mount.

8. The harness assembly of claim 1, further comprising rings or other projections on the strap that function as finger grips.

9. The harness assembly of claim 1, wherein the connector releasably secures the strap about the handheld controller.

10. A handheld controller and harness assembly for securing accessories to the handheld controller, the handheld controller and harness assembly comprising:

(a) a strap structured to conform to at least three sides of an asymmetrically shaped handheld controller and perforated along its length;

(b) an oblong aperture on the strap sized to allow access through the strap to a camera on the handheld controller;

(b) at least one connector that cooperates with a perforation in the strap to secure the strap about the handheld controller; and (c) a wireless module inside the handheld controller, the wireless module configured to wirelessly communicate with an electronic personal mobility device (EPMD);

further comprising a stabilizing side member that connects to a first perforation on a first portion of the strap that corresponds to a first side of the handheld controller and connects to a second perforation on a second portion of the strap that corresponds to a second side of the handheld controller, wherein after the strap is fitted to the handheld controller the stabilizing side member spans the handheld controller from the first side to the second side.

11. The handheld controller and harness assembly of claim 10, wherein the strap of claim 10 comprises at least two straps, at least one of which is flexible.

12. The handheld controller and harness assembly of claim 10, wherein the handheld controller further comprises a display and a speaker.

13. The handheld controller and harness assembly of claim 12, wherein the speaker is a wireless headphone, earphone, or head-mounted audio device wirelessly coupled to the handheld controller.

14. The handheld controller and harness assembly of claim 12, wherein the speaker is configured to operate as a horn or a bell.

15. The handheld controller and harness assembly of claim 10, further comprising a taillight that emits light in the rearward direction of the handheld controller, wherein the taillight is protruding from the rear of the handheld controller or mounted on a taillight mount on the strap.

16. The handheld controller and harness assembly of claim 15, a taillight mount on the strap; wherein the strap is adjustable in length or tightness about the handheld controller to secure the taillight mount in a rearward position on the handheld controller; and wherein the taillight protruding from the rear of the handheld controller or mounted on a taillight mount on the strap is mounted on the taillight mount on the strap.

17. The handheld controller and harness assembly of claim 15, wherein the taillight is configured to operate as a brake light of the EPMD.

18. A kit for securing accessories to a handheld controller, the kit comprising:

(a) at least one flexible strap that is perforated along its length, including an oblong aperture sized to allow access through the at least one strap to a thumb control on the handheld controller;

(b) at least one connector that cooperates with a perforation in the at least one flexible strap to secure the at least one flexible strap about the handheld controller;

(c) a headlight assembly; and (d) a taillight assembly; wherein the flexible strap is adjustable in length or tightness about the handheld controller to secure the headlight assembly in a forward position and the taillight assembly in a rearward position on the handheld controller;

further comprising a stabilizing side member that connects to a first perforation on a first portion of the flexible strap that corresponds to a first side of the handheld controller and connects to a second perforation on a second portion of the flexible strap that corresponds to a second side of the handheld controller, wherein after the flexible strap is fitted to the handheld controller the stabilizing side member spans the handheld controller from the first side to the second side.

19. The kit of claim 18, further comprising a horn or bell mount and/or a mirror mount.

20. A harness assembly for securing accessories to a handheld controller, the harness assembly comprising:

(a) a flexible strap structured to conform to at least three sides of an asymmetrically shaped handheld controller and perforated along its length;

(b) an oblong aperture on the flexible strap sized to allow access through the strap to a thumb control on the handheld controller;

(c) at least one connector that cooperates with a perforation in the flexible strap to secure the flexible strap about the handheld controller;

(d) a headlight mount on the flexible strap; and (e) a taillight mount on the flexible strap; wherein the flexible strap is adjustable in length or tightness about the handheld controller to secure the headlight mount in a forward position and the taillight mount in a rearward position on the handheld controller;

further comprising a stabilizing side member that connects to a first perforation on a first portion of the flexible strap that corresponds to a first side of the handheld controller and connects to a second perforation on a second portion of the flexible strap that corresponds to a second side of the handheld controller, wherein after the flexible strap is fitted to the handheld controller the stabilizing side member spans the handheld controller from the first side to the second side.

21. The harness assembly of claim 20, wherein the flexible strap of claim 1 comprises at least two straps, at least one of which is flexible.

22. The harness assembly of claim 20, further comprising a headlight and a taillight.

23. The harness assembly of claim 20, further comprising a stabilizing side member that secures an accessory to the flexible strap.

24. The harness assembly of claim 20, further comprising a horn or bell mount or a mirror mount.

25. The harness assembly of claim 20, further comprising rings or other projections on the flexible strap that function as finger grips.

26. The harness assembly of claim 20, wherein the connector releasably secures the flexible strap about the handheld controller.

* * * * *